Jan. 15, 1929.
F. McNEILL
1,699,075
LIQUID LEVEL INDICATOR
Filed June 5, 1925
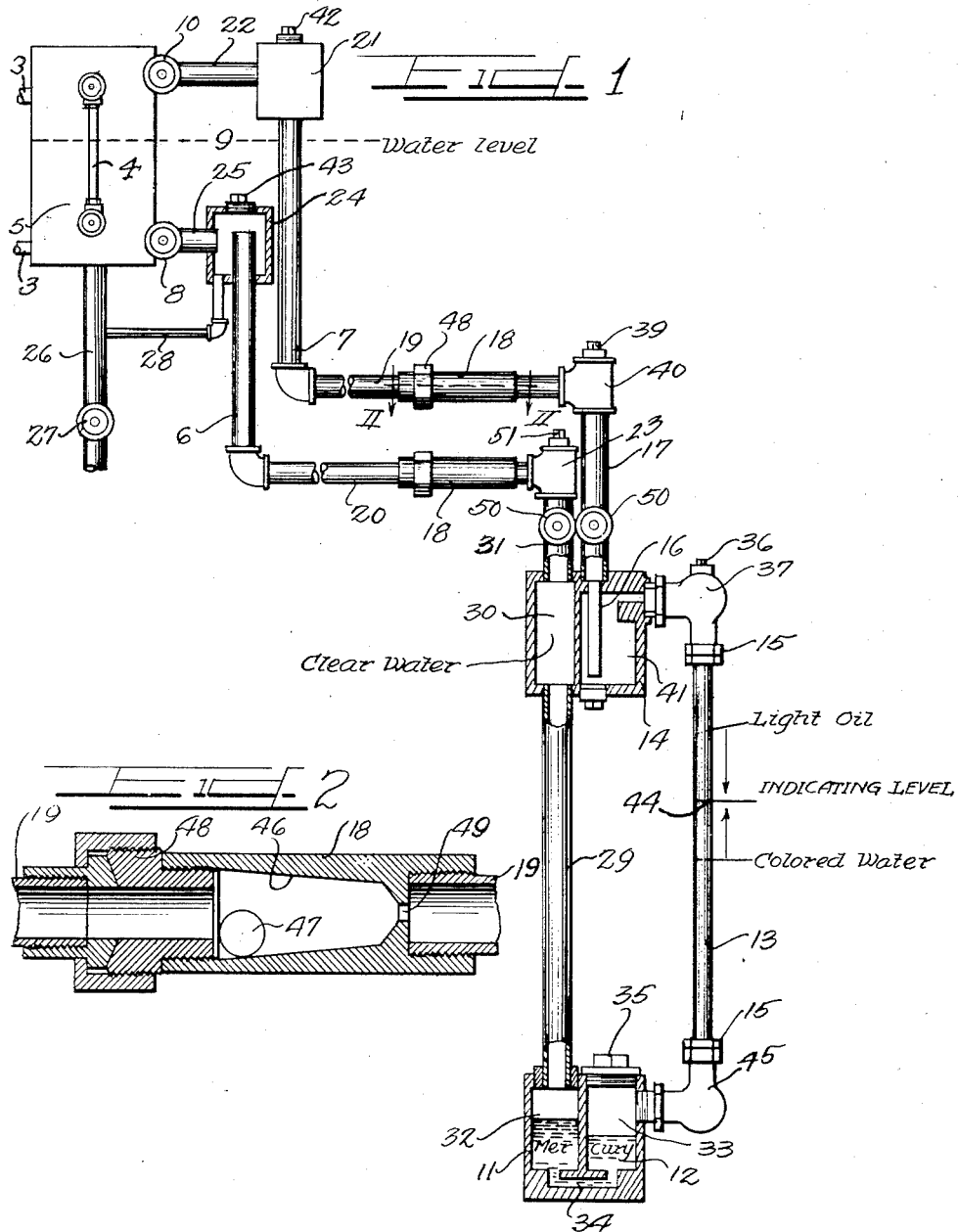
INVENTOR
Frederic McNeill
BY Charles...
ATTY Patented Jan. 15, 1929.

1,699,075

UNITED STATES PATENT OFFICE.

FREDERIC McNEILL, OF FOREST PARK, ILLINOIS, ASSIGNOR TO BOILER ROOM IMPROVEMENT CO., A PARTNERSHIP CONSISTING OF T. W. McNEILL AND IRA J. BABCOCK, OF CHICAGO, ILLINOIS.

LIQUID-LEVEL INDICATOR.

Application filed June 5, 1925. Serial No. 35,049.

The invention relates to liquid level indicators and has special reference to indicators for showing the level of liquid in boilers or the like at a point remote from the boiler.

One of the objects of the invention is to provide accurate, reliable means for clearly and distinctly indicating at a remote point the liquid level in a water container, reservoir, boiler or the like and especially in such devices that are subjected to pressure.

Another object is to provide means between two portions of a movable liquid column to described a distinct indicating line of demarcation, positively and sharply defined by the effect of adjacent liquids of contrasting colors, one imposed upon the other, and between which there is an entire lack of affinity that would cause the associated liquids to mix.

A further object is to provide an improved reliable means for indicating the hydrostatic head and the variation thereof in a closed container or boiler, in which the indicating glass is not subjected to the high temperature of the steam in the boiler.

Another object is to provide improved means whereby a gauge glass or water indicator may be located at a position remote from the boiler and at a lower elevation, more convenient for observation.

Other and further important objects of this invention will be apparent from the disclosures in the specification and the accompanying drawings.

This invention (in a preferred form) is illustrated in the drawings and hereinafter more fully described.

On the drawings:

Figure 1 is a diagrammatic elevation of a liquid level indicator embodying the principles of this invention, showing the same connected with a standard water column of a boiler.

Figure 2 is an enlarged longitudinal detail section taken through one of the automatic valves on line II—II of Figure 1.

As shown on the drawings:

The liquid level indicator of this invention is shown connected to a standard water column 5 of a boiler by means of pipes 3. Mounted on the water column 5 is a standard water glass 4. The improved device consists of two parallel conduits or pipes 6 and 7. The upper end of the conduit 6 projects into the bottom of a casing or trap 24 into which one end of a horizontal pipe 25 projects, the other end of the pipe 25 being connected to the lower portion of the water column 5. Mounted in the pipe 25 between the water column 5 and the trap 24 is a control valve 8. The trap 24 is provided with a filling aperture in its top, said aperture being closed by means of a removable plug or cap 43. Also connected with the bottom of the trap 24 is one end of a discharge or blow-off pipe 28, the other end of which connects with a vertical blow-off pipe 26, the upper end of which is connected with the standard water column 5. A control valve 27 is positioned at a convenient location in the blow-off pipe 26.

The upper end of the conduit 7 projects into the bottom of a condenser tank 21. The top of the condenser tank is provided with a filling opening which is adapted to be closed by a removable cap or plug 42. Also projecting into the condenser tank 21 is one end of a horizontal pipe 22, the other end of which is connected with the upper portion of the standard water column 5. Positioned in the pipe 22 between the condenser tank 21 and the standard water column 5 is a control valve 10.

Connected to the lower end of the conduit 7 by means of an elbow is one end of a horizontal pipe 19, the other end of which is connected to a T-joint or T-connector 40. The upper end of the T-connector is closed by means of a removable cap or plug 39. Mounted in the pipe 19 between the conduit 7 and the T-connector 40 is an automatic check valve designated as a whole by the reference numeral 18.

Connected to the lower end of the conduit 6 by means of an elbow is one end of a horizontal pipe 20, the other end of which is connected to a T-joint or T-connector 23. The upper end of the T-connector 23 is closed by means of a removable plug or cap 51. Connected in the pipe 20 between the conduit 6 and the T-connector 23 is another automatic check valve, also indicated as a whole by means of the reference numeral 18.

One of the automatic check valves is shown in section in Figure 2 and comprises a casing 18 having a tapered bore 46 in which a ball valve 47 is disposed. A union fitting 48 connects one end of the valve casing 18 to the pipe 19 or 20, as the case may be. The casing 18 is provided with a transverse wall having a valve port 49 therein. A portion of the pipe 19 is threaded into the second end of the casing 18. Connected into the lower end of the T-connector 23 is the upper end of a pipe 31 having a control valve 50 therein. The lower end of the pipe 31 is connected into the top of an oil trap casing 14 and communicates with a water chamber 30 in said oil trap. The chamber 30 is formed by means of a partition provided within the oil trap casing 14 and is merely a continuation of pipe 29, or pipe 31, for convenience of support. Connected to the bottom of the casing 14 and communicating with the water chamber 30 is the upper end of a pipe 29, the lower end of which projects into the top of a lower trap or casing 11 having a T-partition therein dividing said lower trap into chambers 32 and 33 connected by means of a passageway 34. The chambers 32 and 33 and the passageway 34 are adapted to carry mercury 12. The mercury in the trap 11 prevents direct communication of the contents of the respective conduit members. The top of the trap 11 is provided with a filling opening above the chamber 33, said opening adapted to be removably closed by means of a cap or plug 35. Connected to the side of the mercury containing trap 11 and communicating with the chamber 33 is an elbow 45 which supports the lower end of a vertical water glass 13. A stuffing box 15 is disposed between the lower end of the water glass 13 and the elbow 45 to provide a water tight connection. Connected to the upper end of the water glass 13 by means of the stuffing box 15 is one arm of an upper elbow or fitting 37 having a filling opening therein which is adapted to be removably closed by means of a cap or plug 36. The other arm of the elbow 37 connects with the oil trap casing 14 and communicates with an oil chamber 41.

Connected with the bottom of the T-connector 40 is the upper end of a pipe 17 having a control valve 50 therein. The lower end of the pipe 17 is connected with the top of the oil trap casing 14. A smaller pipe 16 is disposed within the chamber 41 of the oil trap casing 14, with the upper end of said pipe 16 being in communication with the lower end of the pipe 17. The pipe 16 descends to a point near the bottom of the oil trap casing 14.

The water glass 4 on the water column 5 is provided for the purpose of indicating the water line 9 to designate the level of the water in the boiler.

The trap or casing 24 is connected with the standard water column 5 by means of the pipe 25 and is adapted to act as a container for receiving any sediment that may come from the boiler and settle therein.

The operation is as follows:

When it is desired to charge the device for operation the control valves 8 and 10 are closed to cut off communication with the standard water column 5. The cap 35 is now removed from the trap 11 and mercury 12 is introduced into the chamber 33. The mercury flows from the chamber 33 through the passage 34 and into the chamber 32. Only a small amount of mercury is necessary, as the chambers 32 and 33 are only required to be filled about one-half full. After mercury has been introduced into the chambers 32 and 33 as described, the plug 35 is put back into place.

The plug 36 closing the opening in the elbow 37 is now removed and water which has first been colored, preferably a brilliant red color, is poured into the water glass 13 and passes downwardly to fill the upper unoccupied portion of the chamber 33 above the mercury. The colored water is adapted to stand in the water glass 13 to a point substantially at the level of the upper stuffing box 15 and is balanced by a head of water in the pipe 29. The plug 39 is next removed from the T-connector 40 and a light oil having a specific gravity much less than that of water is poured into the pipe 17 and fills the chamber 41 of the oil trap casing 14 and the chambers within the elbow connector 37 until the oil starts to flow from the opening in said elbow 37. The plugs 39 and 36 are now put back into position to close the openings in the T-connector 40 and the elbow 37, respectively. The light oil which is introduced into the chamber 41 has a specific gravity less than water and is non-miscible therewith. The trap 41 prevents the oil, or lighter liquid from ascending into pipes 16 and 17.

The cap or plug 42 is now removed from the condenser tank 21, and the pipes 17, 19 and 7, and the condenser tank 21 and pipe 22 are filled with water, after which the plug 42 is put back into place to close the condenser tank. The plug 43 of the sediment trap 24 is next removed and said trap is filled with water. The pipe 29, the water chamber 30 in the trap 14 and the pipes 31, 20 and 6 are filled with water, as well as the pipe 25 leading to the lower end of the standard water column 5. The plug 43 is now put back into place to close the top of the sediment trap 24. With the various pipes and chambers of the system filled with mercury, colored liquid, oil and water, as hereinabove described, the device is ready for operation. The control valves 8 and 10 may now be opened to connect the improved liquid level indicator with the standard boiler water column 5. If the standard water column 5 at this time is only partly filled with water, then the colored liquid in the indicating glass or tube 13 should reach a point substantially indicated by the line 44. The oil which has been poured into the chamber 41 and the elbow 37 of course reaches the upper level of the colored water and is superposed there-above. Since the oil and colored water will not mix, there will be a clear line of demarcation between the colored water and the oil, clearly visible at the point 44 in the tube 13. The line of demarcation indicating the level is variable.

With the control valves 8 and 10 open, the pressure from the boiler and the hydrostatic head therein is communicated to the standard water column 5 and to the vertical conduits 6 and 7 connected therewith. The two heads of water in the conduits 6 and 7 will be balanced and the indicating level 44 in the tube 13 will correspond with the indicating level 9 of the water glass 4. Any increase in the hydrostatic head in the boiler will cause some of the mercury 12 in the chamber 32 to pass through the passage 34 into the chamber 33 and thereby displace the colored water in the upper portion of the chamber 33 and cause said colored water to rise in the water glass 13 corresponding to the rise of the hydrostatic head in the boiler. Should a larger movement be desired in the water glass 13, the cross-sectional area of the opening or bore of the water glass 13 may be reduced, thereby causing the mercury displacement in the chambers 32 and 33 to cause a relatively longer movement of the colored water in the water glass 13 to make any variations or changes in the indicating level more conspicuous.

The hydrostatic head in the conduit 6 extends substantially from the water line 9 to the bottom of the mercury trap 11, while the hydrostatic head in the conduit 7 extends from the top of the condenser tank 21 to the bottom of the mercury trap 11. The mercury therefore in the chamber 32 will normally be at a little higher elevation or level than that in the chamber 33, as the hydrostatic head in the boiler decreases. The hydrostatic head in the conduit 6 is varied, while the hydrostatic head in the conduit 7 is substantially constant.

The two automatic check valves 18 disposed in the pipes 19 and 20, respectively, are designed to close automatically in the event of the breakage of the glass 13 or when leakage takes place in any other part of the device below said valves 18 or at a point beyond said valves with respect to the boiler.

Should the pipe 17 be suddenly opened, the rush of water through the valve casing 18 and the pipe 19 will cause the ball valve 47 (Figure 2) to roll through the tapered bore 46 into a position to close the valve port 49 so that said valve 18 will automatically operate in the event of accident to any of the parts of the liquid level indicator taking place below said valve, such as for example, a sudden leak resulting from the breaking of the indicating glass 13, or the like. The valves 18 are of a character that will not increase or decrease the volume of the conduits by their operation, so that they will not disturb any adjustment between the two conduits 6 and 7. In addition to the two automatic check valves 18, hand operated valves 50 are provided in the pipes 17 and 31, respectively, and may be closed by hand as an additional means of safety.

When the sediment chamber or trap 24 requires cleaning, it is only necessary to open the blow-off valve 27 in the pipe 26 to blow-off the standard boiler water column, thereby permitting the sediment from the trap 24 to be discharged through the pipe 28 and blown off through the blow-off pipe 26, thereby permitting cleaning of the trap 24 whenever it is necessary.

The condenser tank 21 is adapted to be filled with water resulting from the condensation of the steam from the upper portion of the water column 5 which may find its way into said tank 21 so that the conduit 7 will always have a constant head.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A liquid level indicator for connection with a water column of a boiler, comprising two, generally vertical, conduit members, the upper member for connection above the water line of the column and the lower member for connection below the water line thereof, said members connected together at their adjacent ends to form one closed conduit; a mercury trap at the connected ends of said members; a vertical water glass section in the upper member above the aforesaid connected ends; a liquid in the lower part of the glass, of less specific gravity than the mercury and a liquid in the upper part of the glass of less specific gravity than the lower liquid and of contrasting color and a trap in the upper conduit near the upper end of said glass to prevent the lighter liquid from ascending thru said conduit member.

2. A liquid level indicator for connection with a container having a variable hydrostatic head, comprising two generally vertical conduit members, the upper member for connection above the water line of the container and the lower member for connection below the water line thereof, said members connected together at their adjacent ends forming a mercury trap at said meeting ends to prevent interchange of contents of said members above the mercury; a vertical water glass section in the upper member above the mercury; a liquid in the lower part of said water glass, above the mercury and another liquid of lighter specific gravity than the liquid in the lower part of said glass and of contrasting color in the upper part of said water glass whereby to visually indicate variation of altitude of the meeting line of the two liquids in said glass.

3. A liquid level indicator for connection with a liquid reservoir and including two generally vertical conduit members, the upper member for connection above the liquid line in said reservoir and the lower member for connection below said water line; a mercury trap connected between the adjacent ends of said conduits; a water glass tube in the upper conduit above the mercury trap; a liquid in the lower part of said tube having less specific gravity than mercury and superposed thereon; a liquid in the upper part of said glass tube having less specific gravity than the liquid immediately below and of contrasting color, and a trap in said upper conduit immediately above the last mentioned liquid, the remainder of the upper conduit being filled with the liquid of the reservoir.

4. A liquid level indicator adapted for connection with a container, including a pair of conduits interconnected at their outer ends, one of said conduits having a transparent portion therein, a liquid of high specific gravity in said conduits adjacent the interconnection thereof, and a plurality of non-miscible liquids of varying specific gravity superposed above said heavy liquid in the partially transparent conduit, a division line between said liquids being within said transparent portion.

5. A liquid level indicator adapted for connection to a container, comprising a pair of conduits connected to said container, a U-trap interconnecting said conduits at their other ends, a transparent tube forming a portion of one of said conduits, said last mentioned conduit containing three non-miscible liquids in superposed relation, the dividing line between two of said liquids being within said transparent portion.

6. A liquid level indicator adapted for connection to a container, comprising a pair of conduits, a U-trap connecting the same to form a continuous passage, and a transparent tube forming a portion of one of said conduits, said passage containing three liquids of various colors in juxtaposed relationship adjacent said tube, said liquids being non-miscible and of different specific gravities, a division line between two of said liquids being within said tube.

In testimony whereof I have hereunto subscribed my name.

FREDERIC McNEILL.